(12) United States Patent
Sato et al.

(10) Patent No.: US 8,347,082 B2
(45) Date of Patent: Jan. 1, 2013

(54) METHOD OF VALIDATION PUBLIC KEY CERTIFICATE AND VALIDATION SERVER

(75) Inventors: Akane Sato, Yokohama (JP); Yoko Hashimoto, Yokohama (JP); Shingo Hane, Tokyo (JP); Takahiro Fujishiro, Yokohama (JP); Masahiko Furuya, Narashino (JP); Masami Uzawa, Tokyo (JP)

(73) Assignee: Hitachi, Ltd., Tokyo (JP)

(*) Notice: Subject to any disclaimer, the term of this patent is extended or adjusted under 35 U.S.C. 154(b) by 593 days.

(21) Appl. No.: 12/542,798

(22) Filed: Aug. 18, 2009

(65) Prior Publication Data

US 2010/0122081 A1    May 13, 2010

(30) Foreign Application Priority Data

Nov. 12, 2008  (JP) .................................. 2008-290143

(51) Int. Cl.
*H04L 29/06* (2006.01)
(52) U.S. Cl. ........................................ 713/158; 380/285
(58) Field of Classification Search .................... 713/158
See application file for complete search history.

(56) References Cited

U.S. PATENT DOCUMENTS 7,500,100 B1 *    3/2009  Kobozev et al. ............... 713/168
2008/0104401 A1 *  5/2008  Miyamoto et al. ............ 713/175

FOREIGN PATENT DOCUMENTS

JP    2002-139996    5/2002

OTHER PUBLICATIONS

Myers, M., et al., "X.509 Internet Public Key Infrastructure Online Certificate Status Protocol-OCSP", The Internet Engineering Task Force (IETF) Network Working Group, © 1999.

* cited by examiner

*Primary Examiner* — Kambiz Zand
*Assistant Examiner* — Ghodrat Jamshidi
(74) *Attorney, Agent, or Firm* — McDermott Will & Emery LLP

(57) ABSTRACT

In response to a validation request that includes second information identifying the certificate authority, key information of the certificate authority at issuance of the public key certificate, and information identifying the public key certificate, if the second information identifying the certificate authority included in the validation request corresponds to the first information identifying the certificate authority included in the authority certificate, and the information identifying the public key certificate included in the validation request does not exist in the revocation information, the validation server creates a validation result indicating that the public key certificate corresponding to the information identifying the public key certificate included in the validation request is valid.

16 Claims, 11 Drawing Sheets

FIG. 6

CERTIFICATE AUTHORITY IDENTIFICATION TABLE 60

| | AUTHORITY CERTIFICATE (61) | HASH VALUE (SHA1) [AUTHORITY CERTIFICATE IDENTIFIER] (62) | HASH VALUE (SHA256) (63) | HASH VALUE (SHA512) (64) | HASH VALUE (ARBITRARY HASH ALGORITHM) (65) | AUTHORITY IDENTIFIER (66) |
|---|---|---|---|---|---|---|
| CA1_new CERTIFICATE | | 12345 / abcde | 135791113 / acegikmoq | 136912151821 / bdfhjlnprtvx | 121212 / ababab | 12345 |
| CA1_old CERTIFICATE | | 12345 / aabce | 135791113 / aacegikmo | 136912151821 / bbdfhjlnprtv | 121212 / aababa | |
| CA2_new CERTIFICATE | | 34567 / aaabc | 579111315 / aaacegikm | 6912151821247 / bbbdfhjlnprt | 14141 / aaabab | 34567 |
| CA2_new CERTIFICATE | | 34567 / aaaab | 579111315 / aaacegik | 6912151821247 / bbbbdfhjlnpr | 14141 / aaaaba | |
| CA3 CERTIFICATE | | 56789 / aaaaa | 911131517 / aaaaacegi | 12151821247 / bbbbbdfhjlnp | 17171 / aaaaab | 56789 |

FIG. 8

REVOCATION INFORMATION TABLE 80

| CERTIFICATE AUTHORITY IDENTIFIER | OID OF SIGNATURE ALGORITHM | CRL VALIDITY PERIOD | SERIAL NUMBER OF REVOKED CERTIFICATE | CERTIFICATE REVOCATION DATE | REASON OF CERTIFICATE REVOCATION |
|---|---|---|---|---|---|
| 12345 | 1.2.840.113549.1.1.11 | 2008/01/15/00:00:00, 2008/01/17/23:59:59 | 3 | 2006/09/12/18:03:00 | 1 |
| | | | 5 | 2006/09/15/13:34:00 | 3 |
| | | | 122 | 2006/10/03/09:24:00 | 3 |
| | | | 123 | 2006/10/03/10:58:00 | 0 |
| | | | 200 | 2007/01/10/07:24:00 | 1 |
| 34567 | 1.2.840.113549.1.1.5 | 2008/01/15/10:00:00, 2008/01/17/09:59:59 | 1530 | 2006/12/24/08:15:40 | 4 |
| | | | 1682 | 2007/01/09/09:45:24 | 0 |
| 56789 | 1.2.840.10040.4.3 | 2008/01/15/00:00:00, 2008/01/19/23:59:59 | 231 | 2006/11/29/20:24:10 | 0 |
| | | | 247 | 2006/12/29/13:24:20 | 1 |
| | | | 290 | 2007/01/15/17:15:00 | 1 |

VALIDATION SERVER CERTIFICATE IDENTIFICATION TABLE 90

| | | | | |
|---|---|---|---|---|
| AUTHORITY CERTIFICATE IDENTIFIER | 12345 / abcde [Default] | 12345 / aabce | 34567 / aaabc | 34567 / aaaab | 56789 / aaaaa |
| AUTHORITY CERTIFICATE FILE NAME | /tmp/CA1_new.cer | /tmp/CA1_old.cer | /tmp/CA2_new.cer | /tmp/CA2_old.cer | /tmp/CA3.cer |
| VALIDATION SERVER CERTIFICATE FILE NAME | /tmp/ser1_new.cer | /tmp/ser1_old.cer | /tmp/ser2_new.cer | /tmp/ser2_old.cer | /tmp/ser3_.cer |
| RESPONSE SIGNATURE ALGORITHM | SAME AS SIGNATURE ALGORITHM OF AUTHORITY CERTIFICATE | SAME AS CRL SIGNATURE ALGORITHM | SAME AS SIGNATURE ALGORITHM OF AUTHORITY CERTIFICATE | SAME AS CRL SIGNATURE ALGORITHM | SAME AS SIGNATURE ALGORITHM OF AUTHORITY CERTIFICATE |

91 — AUTHORITY CERTIFICATE IDENTIFIER
92 — AUTHORITY CERTIFICATE FILE NAME
93 — VALIDATION SERVER CERTIFICATE FILE NAME
94 — RESPONSE SIGNATURE ALGORITHM

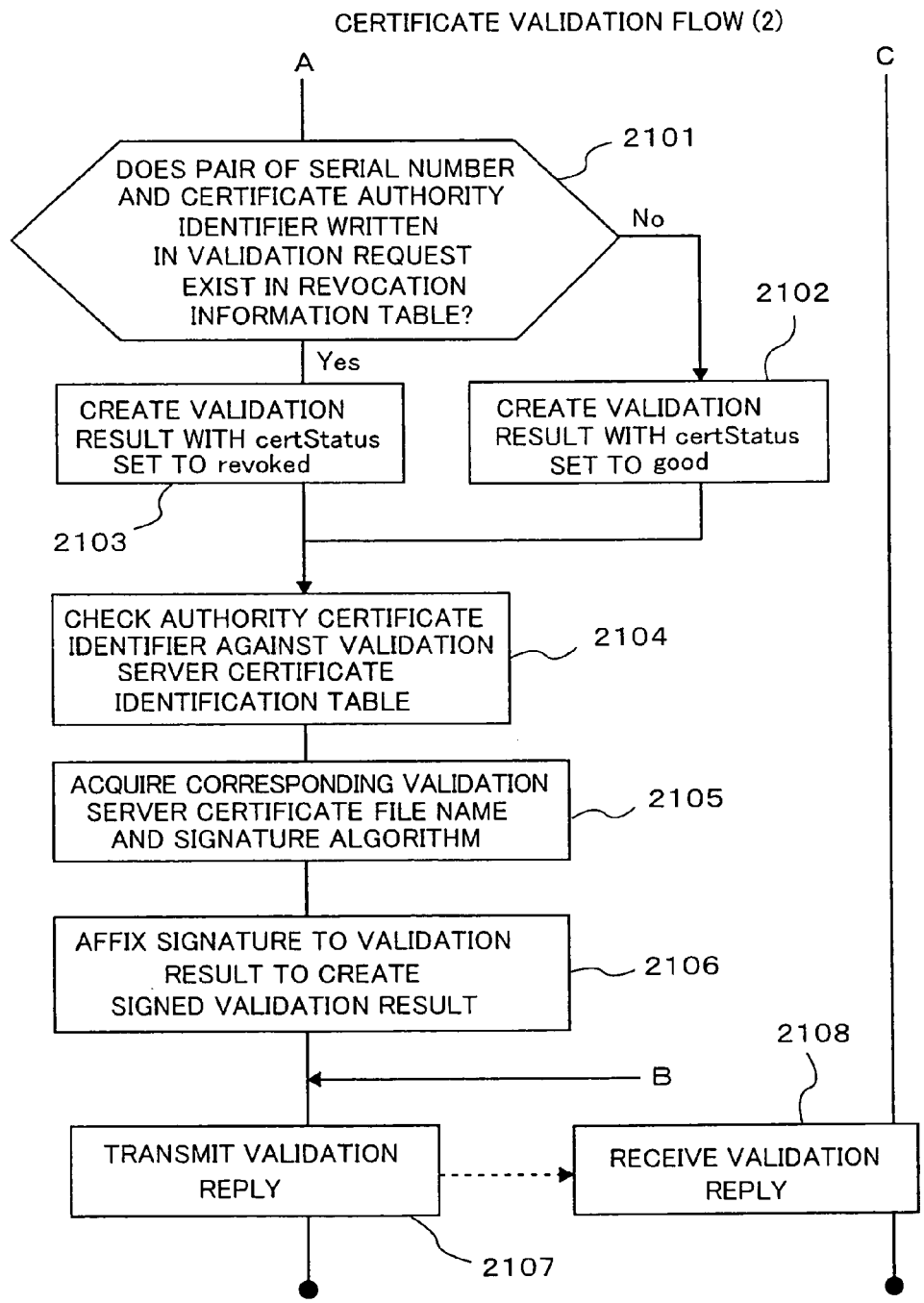

METHOD OF VALIDATION PUBLIC KEY CERTIFICATE AND VALIDATION SERVER

INCORPORATION BY REFERENCE

This application claims priority based on a Japanese patent application, No. 2008-290143 filed on Nov. 12, 2008, the entire contents of which are incorporated herein by reference.

BACKGROUND OF THE INVENTION

The present invention relates to a public certificate for verifying a signature to an electronic procedure received by a certain terminal in a public key infrastructure (hereinafter also referred to as "PKI"), and technology suitable to determine whether the public key certificate is valid.

In the public key infrastructure, when transmitting electronic data such as electronic documents, a transmitter's electronic signature and a public key certificate issued from a certificate authority are attached to the target electronic data. By confirming the validity of the electronic signature (hereinafter referred to as "signature") attached to received data and the public key certificate, the recipient confirms that the transmitted electronic data is not tampered, and is transmitted from the correct transmitter. The issuance and the confirmation of the validity of public key certificates are performed in the public key infrastructure, and the standard specifications are stipulated in RFC5280 (Internet X.509 Public Key Infrastructure Certificate and CRL Profile) and the like.

A public key certificate, when its descriptions have been changed before the public key certificate expires, is revoked and invalidated by a certificate authority that issued the public key certificate. Accordingly, the recipient determines whether the received public key certificate is revoked when confirming its validity.

For the determination of revocation, a certificate revocation list (hereinafter referred to as "CRL") issued from a certificate authority is used. The CRL includes the name (issuerName) and key information (authorityKeyIdentifier) of the certificate authority, the serial numbers (userCertificate) of revoked public certificates of those not expiring that were issued from the certificate authority, CRL validity period, and other information. The CRL is added with a signature of the certificate authority, and is periodically issued by the certificate authority. The recipient acquires the CRL from the certificate authority, and determines whether the serial number of a public key certificate added to received data is written in the acquired CRL. When the serial number is written in the CRL, the recipient determines that the public key certificate is revoked and invalid, and when not written, determines that the public key certificate is valid.

However, when there are a large number of public key certificates issued from certificate authorities, and many revoked public key certificates, the capacity of the CRL becomes enormous. Therefore, there is a problem in that recipients who receive electronic data added with a public key certificate require much time to acquire the CRL, and also much time to confirm the validity of the public key certificate. To address this problem, there is a service (hereinafter referred to as "validation server") that online receives requests to determine whether public key certificates are revoked, and responds to the confirmation requests. Its standard specifications are prescribed in "The Internet Engineering Task Force (IETF), X.509 Internet Public Key Infrastructure Online Certificate Status Protocol OCSP (RFC2560), and page 2 "2.1 Request" "2.2 Response".

The validation server periodically captures CRLs issued from certificate authorities and receives revocation confirmation requests (hereinafter referred to as "validation requests") of public key certificates from terminals (hereinafter referred to as "terminal equipment") used by recipients who confirm the revocation of public key certificates. The validation requests include information (CertID) for identifying a verification target certificate (a public key certificate to be verified). The information (CertID) for identifying a verification target certificate includes a hash algorithm (hashAlgorithm) used by terminal equipment, the name information (issuerNameHash) and key information (issuerKeyHash) of a certificate authority that issued the verification target certificate, and the serial number (serialNumber) of the verification target certificate. The name information (issuerNameHash) and key information (issuerKeyHash) of a certificate authority are generated by respectively subjecting the name data (issuerName) and key data (authorityKeyIdentifier) of the certificate authority to hash calculation by a hash algorithm used by the terminal equipment.

On receiving the validation request, the validation server checks whether the serial number of the verification target certificate is written in the CRL captured previously, and transmits information indicating whether the public key certificate being the verification target certificate is revoked, to the terminal equipment. The response message (hereinafter referred to as "validation result") transmitted from the validation server to the terminal equipment includes information indicating whether the status of the verification target certificate is valid (good), revoked, or unknown. Furthermore, the signature and certificate (hereinafter referred to as "validation server certificate") of the validation server that has performed the verification are added to a validation result so that the user of the terminal equipment can confirm that the validation result has been transmitted correctly by the validation server.

The CRL contains all the serial numbers of public key certificates revoked at the time when the certificate authority created the CRL.

There can occur a case where plural certificate authorities are operated, a certificate authority that issued a public key certificate attached to electronic data by a transmitter differs from a certificate authority used by a recipient, and the recipient cannot confirm the validity of the transmitter's public key certificate. In such a case, a technology for allowing the validation server to address plural certificate authorities is disclosed in JP-A No. 2002-139996.

SUMMARY OF THE INVENTION

A secret key used to affix signature to public key certificates and a CRL issued by a certificate authority is updated either periodically or when it is determined that there is a concern in terms of security. To address this, when the certificate authorities have updated the secret key, the public key certificates and the CRL are signed for issuance with an updated new secret key of the certificate authority. Public key certificates issued before the secret key is updated are effectively used if they do not expire and there is no revocation reason. In such a situation, the validation server captures the CRL signed with the new secret key from the certificate authority, and terminal equipment transmits, to the validation server, a validation request for public key certificates signed with the old secret key of the certificate authority that were issued before the secret key of the certificate authority is updated.

The validation server determines whether, of information (cert ID) for identifying the public key certificates being verification target certificates, included in the validation request, name information (issuerNameHash) as information for identifying the certificate authority and key information of the certificate authority (issuerKeyHash) correspond to a certificate authority name (issuerName) and key information of a certificate authority (authorityKeyIdentifier) in the captured CRL. When the secret key of the certificate authority has been updated, since the key information (issuerKeyHash) included in the validation request and key information (authorityKeyIdentifier) written in the CRL do not correspond to each other, there is a problem in that the validation server cannot confirm the revocation of the verification target certificate.

Since "The Internet Engineering Task Force (IETF), X.509 Internet Public Key Infrastructure Online Certificate Status Protocol OCSP (RFC2560), and page 2 "2.1 Request" "2.2 Response" does not consider the case where secret a key of a certificate authority is updated, it does not address the problem of a case where a validation server cannot confirm the revocation of verification target certificates.

Regarding this problem, when a certificate authority before secret key is updated, and a certificate authority after the secret key is updated are regarded as plural different certificate authorities to apply the technology shown in JP-A No. 139996/2002, the following new problem occurs.

When the secret key has been updated, a validation server regards the certificate authority as a new one, and stores a subsequently captured CRL in association with the new certificate authority, and the CRL associated with an old certificate authority captured before the secret key is updated is no longer updated. Although the capacity of the CRL decreases gradually as public key certificates written in the CRL expire, all public key certificates written in the CRL remain until expiring. However, in the CRL captured after the secret key is updated, the serial numbers of all public key certificates that have been within a validity period but have been revoked at that time are written, regardless of the updating the secret key. As a result, the serial numbers of public key certificates revoked before the secret key is updated are duplicately stored in two CRLs held in the validation server. If there are more revoked public key certificates, there are problems in that not only the storage capacity increases due to the duplicate storage but the serial numbers of public key certificates that were issued by the old certificate authority and revoked that are held in association with the new certificate authority are not referenced.

Furthermore, the following new problem also occurs. A certificate authority does not always need to bring the timing of updating secret key into coincidence with the timing of creating a CRL. Accordingly, consider the case where the validation server captures a CRL created at time $t_1$ by a certificate authority, and captures the next CRL created at time $t_3$ by the certificate authority after it updates secret key at time $t_2$ (time $t_1 < t_2 < t_3$). In this case, although public key certificates revoked between times $t_1$ and $t_2$ were issued using secret key of the old certificate authority, they are not included in a not-updated CRL associated with the old certificate authority, resulting in a wrong validation result that a reply indicating "valid" is given to validation requests.

From the above, the problem remains unsolved that a validation server might not confirm the revocation of verification target certificates when a secret key of a certificate authority has been updated.

The present invention relates to a validation server that is connected to a certificate authority and terminal equipment, and verifies the validity of public key certificates issued from the certificate authority, and a method for verifying the public key certificates. The present invention has the following aspect. The validation server, when key information of a validation server certificate authority has been updated, holds an authority certificate of the certificate authority including first information identifying the certificate authority and the updated key information. The validation server holds, regardless of before and after the updating of the key information of the certificate authority, revocation information indicating public key certificates issued by the certificate authority that are within validity period and were revoked. In response to a validation request including second information identifying the certificate authority, key information of the certificate authority at issuance of the public key certificate, and information identifying the public key certificate from the terminal equipment, the validation server, if the second information identifying the certificate authority included in the validation request corresponds to the first information identifying the certificate authority included in the authority certificate, and the information identifying the public key certificate included in the validation request does not exist in the revocation information, creates a validation result indicating that the public key certificate corresponding to the information identifying the public key certificate included in the validation request is valid.

The present invention has another aspect. The validation server holds a validation server certificate being a public key certificate of the validation server, uses a secret key corresponding to public key of the held validation server certificate to affix a signature to the validation result, and transmits the signed validation result to the terminal equipment.

The present invention has further another aspect. The validation server holds a pair of the respective hash values of the first information identifying the certificate authority and the updated key information that are included in the authority certificate, and when the second information identifying the certificate authority and the key information of the certificate authority at issuance of the public key certificate that are included in the validation request from the terminal equipment are a pair of their respective hash values, determines whether the hash value of the second information corresponds to the hash value of the first information.

The present invention has further another aspect. When the key information of the certificate authority has been updated, the validation server adds a second identifier different from a first identifier identifying an authority certificate before the key updating of the certificate authority to the authority certificate of the certificate authority that includes the first information identifying the certificate authority and the updated key information and holds the authority certificate.

The present invention has further another aspect. The validation server connects with plural certificate authorities, and if the second information identifying the certificate authority included in the validation request corresponds to third information identifying a certificate authority included in any one of the authority certificates issued from the plural certificate authorities, and information identifying the public key certificate included in the validation request does not exist in the revocation information acquired from the certificate authority identified by the third information, creates a validation result indicating that the public key certificate corresponding to information identifying the public key certificate included in the validation request is valid.

According to the present invention, even when a certificate authority has updated a key, the validity of a public key certificate issued by the certificate authority can be verified regardless of before and after the updating of the key.

BRIEF DESCRIPTION OF THE DRAWINGS

FIG. 6 is a drawing showing an example of an authority identification table;

FIG. 8 is a drawing showing an example of a revocation information table;

FIG. 9 is a drawing showing an example of a validation server certificate identification table;

FIG. 11 is a flowchart of validation processing for public key certificates in a validation server.

DESCRIPTION OF THE PREFERRED EMBODIMENTS

Hereinafter, embodiments of the present invention will be described. First, terms used in the description of this embodiment are described. A secret key of a transmitter is used for electronic signature of the transmitter of electronic data, a certificate authority certifies a public key paired with the secret key of the transmitter, and a signed certificate is a public key certificate. A secret key is used for signature by the certificate authority to the public key certificate, a public key paired with the secret key of the certificate authority is certified by other certificate authorities, and signed certificates are also public key certificates. The public key certificates certified by other certificate authorities are herein referred to as authority certificates. Since public keys are thus certificated by other certificate authorities, plural certificate authorities form a hierarchical structure. A certificate authority of the highest layer, referred to as a route certificate authority, issues public key certificates certified by it. By users placing absolute confidence in the route certificate authority, public key infrastructure is established. In this embodiment, public key certificates issued by the route certificate authority can also be treated as authority certificates. In this embodiment, there is a validation server that provides revocation information of public key certificates. The revocation information is provided as a validation result signed using a secret key of the validation server. A public key paired with the secret key of the validation server is certified by a certificate authority, and a signed certificate is also a public key certificate. The public key certificate to certify the public key paired with the secret key of the validation server is referred to as a validation server certificate. Thus, the public key certificate, authority certificate, and validation server certificate have a signature affixed to information about public keys. These certificates, as described below, contain information about certificate authorities such as certificate authority names as information to identify certificate authorities and serial numbers as information to identify public key certificates, and information about terminal equipment, certificate authorities, and validation servers certified by each of them. In descriptions below, mere description of "updating key" or "updating secret key" means concurrent updating of a public key corresponding to the secret key, denoting updating a pair of the secret key and public key.

Figure 1:
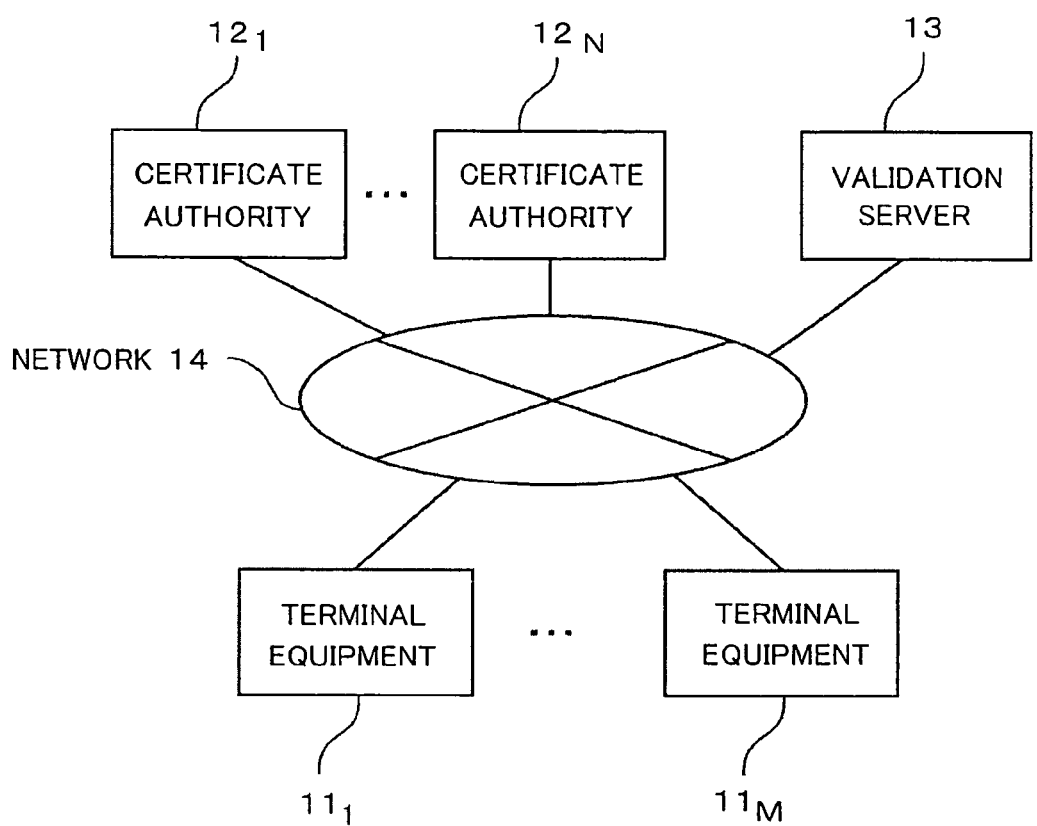
FIG. 1 is a drawing showing the construction of a verifying system.

FIG. 1 is a drawing showing the construction of a verifying system of the present invention. The validation server includes: plural terminal equipments $11_1$ to $11_M$ that electronically execute procedures (transmission of electronic data, etc.); certificate authorities $12_1$ to $12_N$ that issue and revoke public key certificates; a validation server 13 that, based on a certificate revocation list (CRL) of public key certificates issued by the certificate authorities 12, verifies the validity of the public key certificates; and a network 14 such as the Internet that connect them.

Figure 2:
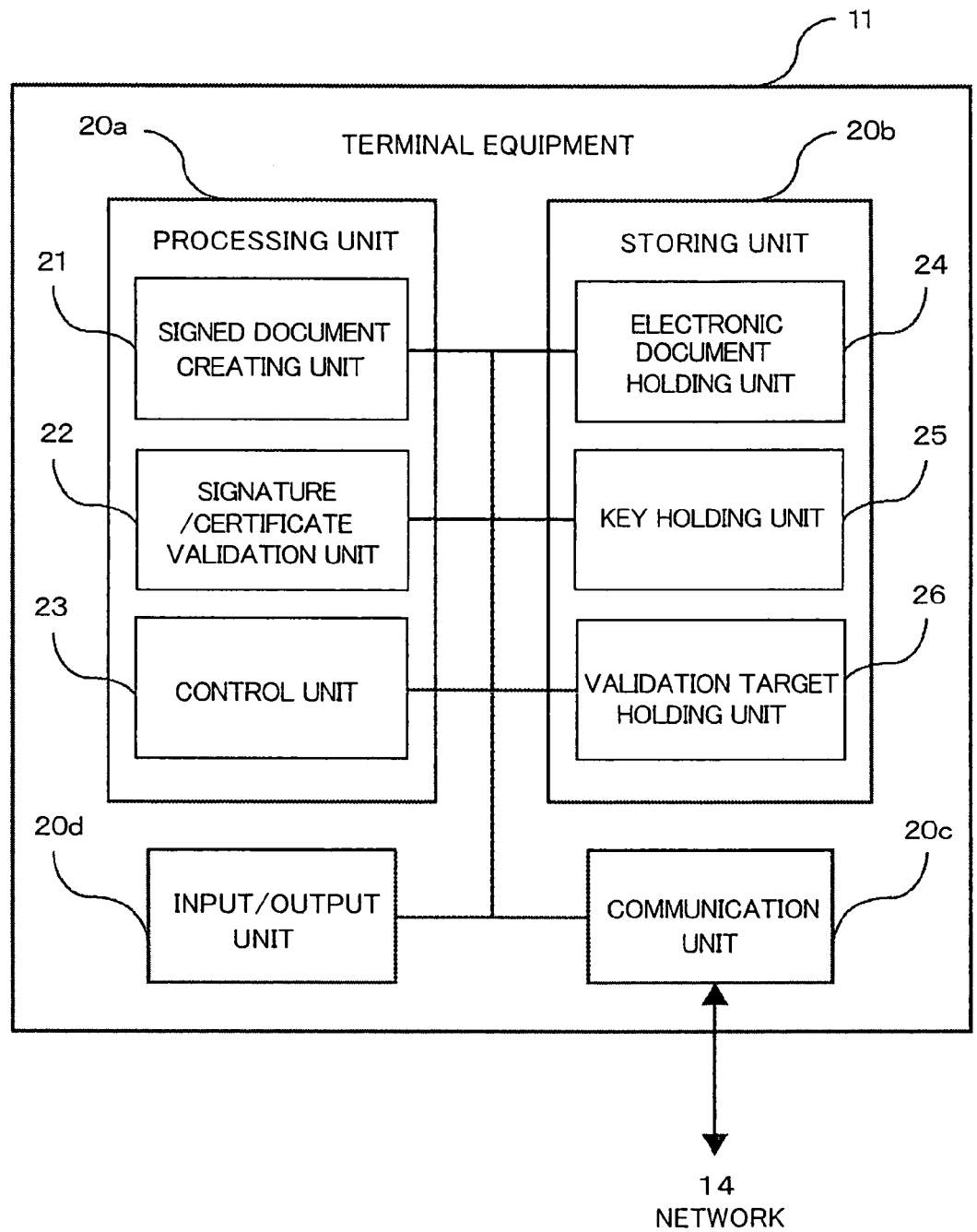
FIG. 2 is a drawing showing the construction of terminal equipment.

FIG. 2 is a drawing showing the construction of terminal equipment 11. The terminal equipment 11 includes: a processing unit 20a; a storing unit 20b; a communication unit 20c for communicating with other devices through the network 14; and an input/output unit 20d that inputs and outputs electronic documents prepared by the user of the terminal equipment 11 and electronic documents received from other terminal equipment 11, and receives commands from users.

In the following description of the terminal equipment 11, for simplicity of the description, public key certificates attached when transmitting electronic documents prepared by the user of the terminal equipment 11 to the other terminal equipment 11 are referred to as own public key certificates, and public key certificates attached to electronic documents received from the other terminal equipment 11 are referred to as other public key certificates.

The processing unit 20a includes: a signed document creating unit 21 that prepares signed documents with a signature affixed to electronic documents using a secret key of the terminal equipment 11; a signature/certificate validation unit 22 that verifies the signature of signed electronic documents from the other terminal equipment 11 and other public key certificates; and a control unit 23 that controls each unit of the terminal equipment 11.

The storing-unit 20b includes: an electronic document holding unit 24 that holds user-prepared documents; a key holding unit 25 that holds secret keys for creating signature, public keys paired with the secret keys, own public key certificates issued from the certificate authorities 12, and authority certificates of the certificate authorities 12 used by the terminal equipment 11; and a validation target holding unit 26 that holds signed electronic documents and other public key certificates received from the other terminal equipment 11.

The control unit 23, from a user through the input/output unit 20d, receives the command to transmit an electronic document holed in the electronic document holding unit 24 to other users. Corresponding to the transmission command, the control unit 23 reads a specified electronic document from the electronic document holding unit 24 and passes it to the signed document creating unit 21. The signed document creating unit 21 creates a signature for the passed electronic document using a secret key held in the key holding unit 25. Then, it prepares a signed electronic document with the created signature affixed to the passed electronic document. The control unit 23 transmits the signed electronic document prepared in the signed document creating unit 21 and an own public key certificate held in the key holding unit 25 to the terminal equipment 11 of a user-specified transmission destination through the communication unit 20c.

The control unit 23, on receiving a signed electronic document and another public key certificate from the other terminal equipment 11 through the communication unit 20c, associates them with each other to hold them in the validation target holding unit 26, and requests the signature/certificate validation unit 22 to verify them.

On receiving the request, the signature/certificate validation unit 22 verifies the signed electronic document held in the validation target holding unit 26 by using the other public key certificate held in association with it. Then, the signature/certificate validation unit 22 verifies, as a verification target certificate, the other public key certificate having been used during verification of the signature of the signed electronic document by using an authority certificate of the certificate authority 12 held in the key holding unit 25. The signature/certificate validation unit 22 performs verification processing such as verification of the signature of the verification target certificate, confirmation of validity period, and confirmation of whether the verification target certificate is revoked.

The signature/certificate validation unit 22 transmits a validation request to the validation server 13 to determine whether the verification target certificate (the other public key certificate to be verified) is revoked. When the verification processing succeeds (including reception from the validation server 13 of a validation result indicating that the verification target certificate is not revoked), the signature/certificate validation unit 22 determines that the verification target certificate is valid, and the signed electronic document with the verification target certificate attached is correct, and if necessary, outputs the result of verifying the signature of the signed document and the verification target certificate through the input/output unit 20d.

Figure 3:
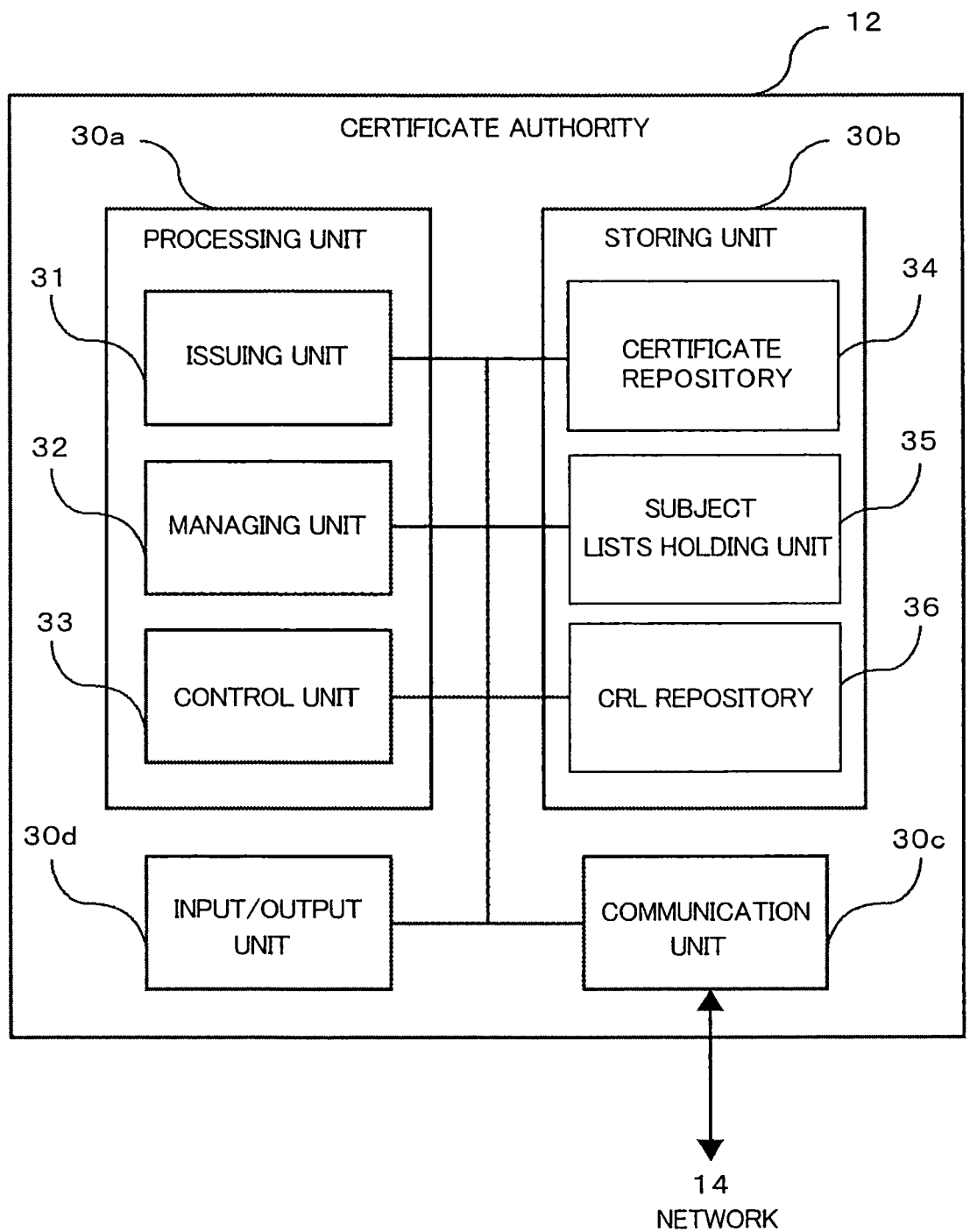
FIG. 3 is a drawing showing the construction of a CA device.

FIG. 3 shows the construction of the certificate authority 12. The certificate authority 12 includes: a processing unit 30a; a storing unit 30b; a communication unit 30c for communicating with other devices through the network 14; and an input/output unit 30d that inputs and outputs various certificates and the like, receives commands from the operator of the certificate authority 12, and outputs processing results.

The processing unit 30a includes: an issuing unit 31 that issues public key certificates; a managing unit 32 that manages public key certificates issued from the issuing unit 31; and a control unit 33 that controls each unit of the certificate authority 12.

The storing unit 30b includes: a certificate repository 34 that holds public key certificates issued from the issuing unit 31; an subject lists holding units 35 that holds an issuance destination management list in which issuance destinations of public key certificates held in the certificate repository 34 are written; and a CRL repository 36 that holds a public key certificate revocation list (CRL).

The control unit 33 receives a request to issue a public key certificate through the input/output unit 30d or communication unit 30c, and passes it to the issuing unit 31. On receiving it, the issuing unit 31 creates a public key certificate for the issuance request, and uses a secret key of the certificate authority 12 to affix a signature to the created public key certificate. It passes the created public key certificate to an issuance requester by mail or communication through the input/output unit 30d or the communication unit 30c. Moreover, it registers the issued public key certificate in the certificate repository 34, and writes information about the issuance destination (or issuance requester) to the issuance destination management list held in the subject lists holding unit 35. Public key certificates registered in the certificate repository 34 and information of issuance destinations of the issuance destination management list are associated with each other so that the information of the issuance destinations can be reference from the public key certificates, and issued public key certificates can be referenced from the information of the issuance destinations.

The control unit 33 receives a request to revoke a public key certificate through the input/output unit 30d or communication unit 30c, and passes it to the managing unit 32. On receiving it, the managing unit 32 deletes the public key certificate to be revoked from the certificate repository 34, and at the same time deletes information of an issuance destination of the public key certificate from the issuance destination management list held in the subject lists holding unit 35. The managing unit 32 periodically creates the public key certificate revocation list (CRL) describing the serial number of the public key certificate deleted from the certificate repository 34 based on the revocation list, and holds it in the CRL repository 36. The created CRL contains the serial numbers, revocation dates, and revocation reasons of public key certificates revoked even within validity period, of public key certificates issued from the certificate authority 12. Furthermore, the created CRL contains the time scheduled to create it the next time, and is added with a signature, using the secret key of the certificate authority 12. Since the CRL to be created the next time also contains the serial numbers and the like of public key certificates revoked even within validity period, the serial numbers and the like of the same public key certificates may be included in the CRL created this time and the CRL to be created the next time. Specifically, since information (revocation information) of all public key certificates revoked even within validity period at the time of CRL creation is included in the CRL, the validation server 13 and the like use the latest CRL. The certificate authority 12 creates revocation information of public key certificates issued in the certificate authority 12 as the CRL, regardless of the updating of key information.

On receiving a CRL acquisition request from the validation server 13 or another device through the communication unit 30c, the control unit 33 transmits the CRL held in the CRL repository 36 to another device that issues the CRL acquisition request, through the communication unit 30c.

Figure 4:
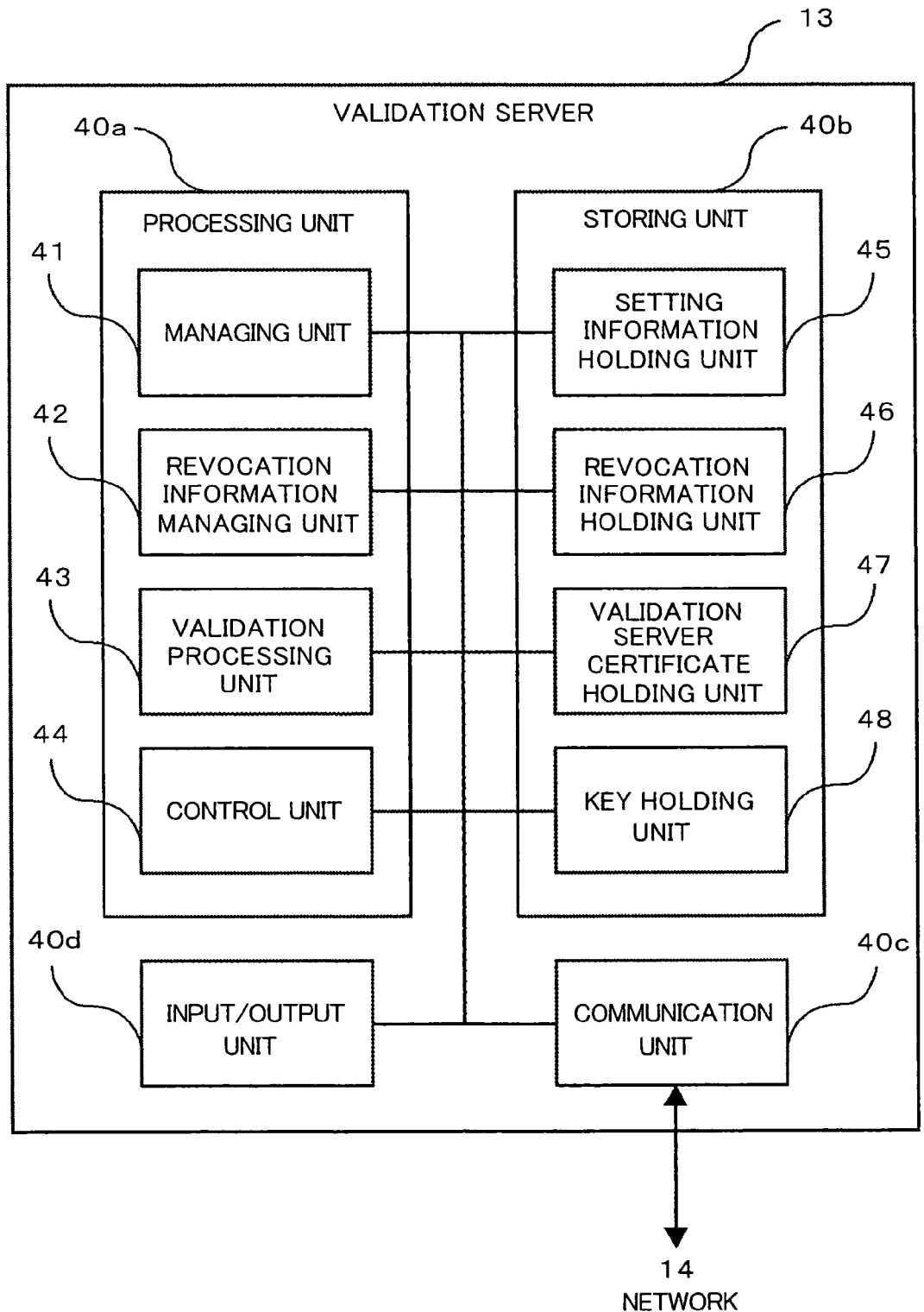
FIG. 4 is a drawing showing the construction of a validation server.

FIG. 4 shows the construction of the validation server 13. The validation server 13 includes: a processing unit 40a; a storing unit 40b; a communication unit 40c for communicating with other devices through the network 14; and an input/output unit 40d that inputs and outputs various certificates and the like, and receives commands from the operator of the validation server 13. The processing unit 40a includes: a managing unit 41; a revocation information managing unit 42; a validation processing unit 43; and a control unit 44 that controls each unit of the validation server. The storing unit 40b includes: a setting information holding unit 45; a revocation information holding unit 46; a validation server certificate holding unit 47; and a key holding unit 48 that holds a secret key of the validation server.

The managing unit 41, as described later, registers authority certificates, hash algorithms, and signature algorithms in the setting information holding unit 45. It also creates a certificate authority identification table 60 described later from the registered authority certificates and the hash algorithms, and registers it in the revocation information holding unit 46. The managing unit 41 registers authority certificates and validation server certificates, creates a validation server certificate identification table 90 described later, and registers it in the validation server certificate holding unit 47. Furthermore, the managing unit 41 registers CRL update timing and other various setting information in the setting information holding unit 45.

The revocation information managing unit 42 accesses the certificate authority 12 through the communication unit 40c to acquire a CRL, creates a revocation information table 80 described later from the acquired CRL, registers it in the revocation information holding unit 46, acquires the CRL according to CRL updating timing set previously in the setting information holding unit 45, and updates the revocation information table 80 of the revocation information holding unit 46.

On receiving a validation request from the terminal equipment 11 through the communication unit 40c, the validation processing unit 43 refers to the certificate authority identification table 60 and the revocation information table 80 that are held in the revocation information holding unit 46, and determines whether the verification target certificate requested for verification is revoked. It refers to the validation server certificate identification table 90 to acquire a validation server certificate corresponding to the validation request, creates signed validation result data, and transmits it to the terminal equipment 11 through the communication unit 40c. The signed validation result data is added with a signature, using the secret key of the validation server held in the key holding unit 48, and is transmitted to the terminal equipment 11 along with the validation server certificate.

Figure 5:
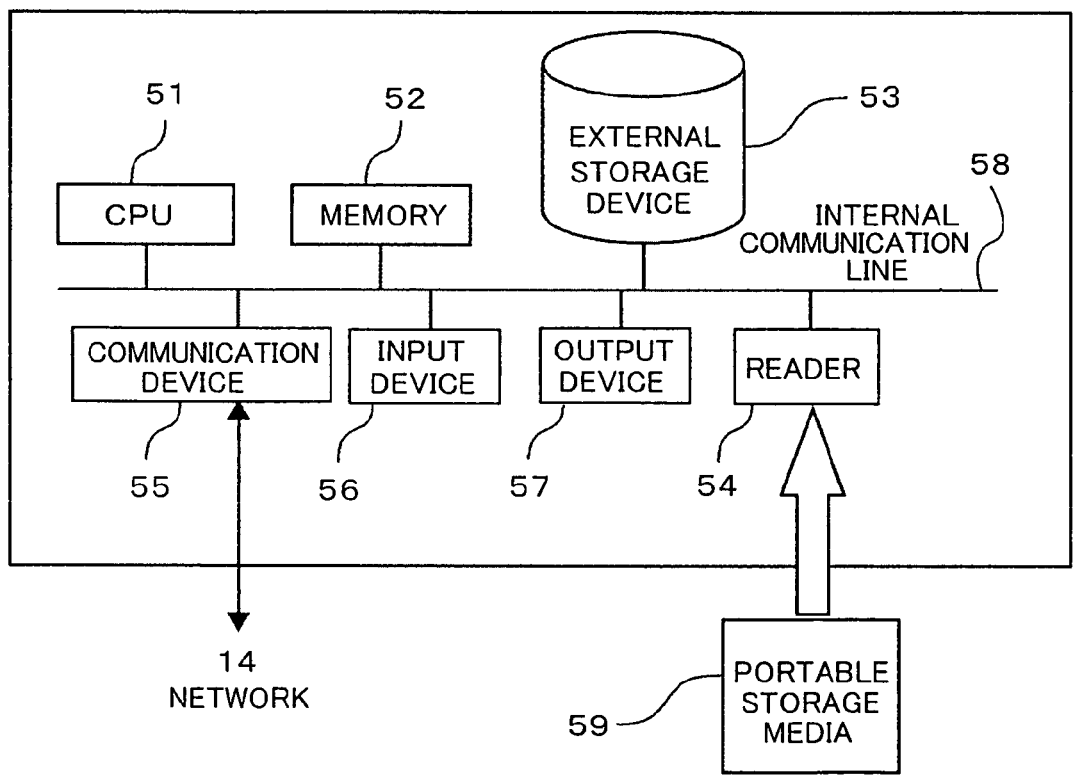
FIG. 5 is a drawing showing an example of hardware construction of each of the terminal equipment, CA device, and validation server.

Each of the terminal equipment 11, the certificate authority 12, and the validation server 13 shown in FIGS. 2 to 4 is built on a common electronic computer that, for example, as shown in FIG. 5, includes: a CPU 51; a memory 52; an external storage device 53 such as hard disk; a reader 54 that reads information from portable storage media 59 such as CD-ROM; a communication device 55 for communicating with other devices through the network 14; an input device 56 such as keyboard and mouse; an output device 57 such as monitor and printer; and an internal communication line 58 through which data is transmitted and received among the devices.

The above-described processing units are implemented by the CPU 51 executing a specified program loaded from the external storage device 53 into the memory 52. Specifically, the communication units 20c, 30c, and 40c are implemented by the CPU 51 using the communication device 55, the input/output units 20d, 30d, and 40d are implemented by the CPU 51 using the input device 56, output device 57, and reader 54, and then the storing unit 20b, 30b, and 40b are implemented by the CPU 51 using the memory 52 and external storage device 53. The processing units 20a, 30a, and 40a are implemented as processing processes of the CPU 51.

A specified program to implement each of the processing units may be previously stored in the external device 53, may be read as required from the storage media 59 available to the electronic computer through the reader 54, and may be one that is downloaded as required from the network which is a communication media available to the electronic computer, or from other devices connected with the communication device 56 using carriers propagating on the network, and is stored in the external storage device 53.

The validation server 13 performs the setting of authority certificates, hash algorithms, and signature algorithms, updates CRL, and verifies public key certificates.

The setting of authority certificates and hash algorithms performed by the validation server 13 is described. The operator of the validation server 13 registers an authority certificate of the certificate authority 12 that the validation server 13 addresses, a validation server certificate issued from the certificate authority 12, and performs the setting of a hash algorithm acceptable to the validation server 13.

The operator of the validation server 13 inputs an authority certificate to the validation server 13 through the input/output unit 40d. The managing server 41 holds the inputted authority certificate in the setting information holding unit 45. When the validation server 13 addresses plural certificate authorities 12 (captures CRLs issued from plural certificate authorities 12), it likewise registers authority certificates of the certificate authorities 12. When one of the certain certificate authorities 12 updates a secret key and has plural authority certificates, it likewise registers authority certificates containing public key information corresponding to a new secret key and authority certificates containing public key information corresponding to an old secret key (when there are plural generations of old keys, authority certificates not expiring, of those corresponding to the generations of secret keys). As a result, in the setting information holding unit 45, authority certificates of the certificate authorities 12 that the validation server 13 addresses, and when the certificate authorities 12 update secret keys, authority certificates containing public key information corresponding to the generations of secret keys that do not expire are held.

When key information of a certificate authority has been updated, the validation server 13 may receive authority certificates from the certificate authority 12 through the network 14 and then register them.

The operator of the validation server 13 inputs the object identifier (hereinafter referred to as "OID") of a hash algorithm acceptable to the validation server 13 through the input/output unit 40d. The managing unit 41 holds the OID of the inputted hash algorithm in the setting information holding unit 45. When the validation server 13 accepts plural hash algorithms, it likewise sets the OIDs of the plural hash algorithms. It also registers one of the plural hash algorithms with the OIDs registered, as a reference algorithm. A program to execute a hash algorithm identified by OID is previously stored in the validation server 13.

The managing unit 41 of the validation server 13 creates a certificate authority identification table, based on the registered authority certificates and the set hash algorithms, and holds it in the revocation information holding unit 46.

FIG. 6 shows an example of a certificate authority identification table 60 in the revocation information holding unit 46 of the validation server 13. The certificate authority identification table 60, for each of the names of authority certificates 61, includes pairs 62 to 65 of the hash value of subject name (subject) and the hash value of public key (subjectPublicKeyInfo) that are written in an authority certificate, obtained using a hash algorithm acceptable to the validation server 13, and the identifier 66 of a certificate authority that issued the authority certificate.

The certificate authority identification table 60 is created as described below by the managing unit 41. The managing unit 41 acquires an authority certificate held in the setting information holding unit 45, and writes the name of the acquired authority certificate to the row of the authority certificate 61 of the certificate authority identification table 60. The managing unit 41 refers to the OID of a hash algorithm held in the setting information holding unit 45, uses the hash algorithm to calculate the hash value of subject name (subject) and the hash value of public key (subjectPublicKeyInfo) that are to be written to the authority certificate, and writes a pair of the two values to a corresponding position of the certificate authority identification table 60.

In FIG. 6, the validation server 13 is set to confirm the revocation of public key certificates issued from certificate authorities 1 (CA1), 2 (CA2), and 3 (CA3). The drawing shows that the certificate authority 1 (CA1) updates key, and a new authority certificate (CA1_new certificate) issued after the updating, and an old authority certificate (CA1_old certificate) before the updating are valid (within validity period). Also as for the certificate authority 2 (CA2), like the certificate authority 1 (CA1), the drawing shows that a new authority certificate (CA2_new certificate) and an old authority certificate (CA2_old certificate) are valid.

The drawing shows that SHA-1, SHA-256, SHA-512, and an arbitrary algorithm are available as hash algorithms acceptable to the validation server 13. This is because although SHA-1 is presently used primarily as an algorithm used for hash calculation, as SHA-1 is becoming weak, the validation server 13 must provide for the possibility that other algorithms such as SHA-256 and SHA-512 will be used in the terminal equipment 11 in future.

The following describes the relationship between a pair of the hash value of subject name (subject) and the hash value of public key (subjectPublicKeyInfo) with a new authority certificate (CA1_new certificate) of the certificate authority 1 (CA1) as an example. The validation server 13 calculates the hash value of subject name (subject) and the hash value of public key (subjectPublicKeyInfo) written in the CA1_new certificate, using the SHA-1 algorithm, and writes a pair of calculation results to the row of the hash value (SHA-1) 62 of the column of the CA1_new certificate of the certificate authority identification table 60. Likewise, pairs of hash values calculated using the hash algorithms SHA-256 and SHA-512, and an arbitrary algorithm are written to the row of a hash value (SHA-256), the row of a hash value (SHA-512) 64, and the row of a hash value (arbitrary hash algorithm) 65 of the certificate authority identification table 60.

The hash value of a subject name (subject) written to an authority certificate, calculated according to a reference algorithm, is defined as a certificate authority identifier 66 of the authority certificate. In FIG. 6, SHA-1 is used as a reference hash algorithm. The following description uses the case of the certificate authority 1 (CA1). Although key updating causes the hash values of public keys (subjectPublicKeyInfo) to differ between the new authority certificate (CA1_new certificate) and the old authority certificate (CA1_old certificate), since the certificate authority (CA1) is the same, the hash value (12345) of the subject name (subject) is also the same.

A pair 62 of the hash value of subject name (subject) and the hash value of public key (subjectPublicKeyInfo), calculated by the reference hash algorithm, is used as an authority certificate identifier.

The following describes the setting of a signature algorithm executed by the certificate validation server 13.

The operator of the validation server 13 sets a signature algorithm used to affix a signature to a validation result, using a validation server certificate issued from the certificate authority 12 according to a prescription specified by the certificate authority 12 that issues the validation server certificate. The prescription specifies, as a signature algorithm for validation results, any one of the signature algorithm of authority certificate, the signature algorithm of validation server certificate, and the signature algorithm of CRL. The managing unit 41 holds the set signature algorithm in the setting information holding unit 45.

The operator of the validation server 13 inputs an authority certificate and a validation server certificate to the validation server 13 through the input/output unit 40d. When the validation server 13 addresses plural certificate authorities 12 (captures CRLs issued from plural certificate authorities 12), it likewise registers authority certificates of the certificate authorities 12 and validation server certificates issued from the certificate authorities 12. When the certificate authority 12 updates a secret key and issues plural generations of authority certificates, it likewise inputs authority certificates corresponding to a new secret key and authority certificates corresponding to an old key, and validation server certificates issued from the certificate authority 12 of the new secret key and validation server certificates issued from the certificate authority 12 of the old secret key (when there are plural generations of old keys, all of authority certificates of the secret keys and validation server certificates issued from the certificate authorities 12 that do not expire). As a result, in the validation server certificate holding unit 47, authority certificates of all certificate authorities that the validation server 13 addresses, and all validation server certificates issued from the certificate authorities 12, and when the certificate authorities 12 update secret key, authority certificates of all generations of secret key and all validation server certificates issued from the certificate authorities 12 that do not expire are registered. It is efficient that the authority certificates are inputted at a time, considering the case of holding them in the setting information holding unit 45 described previously.

The managing unit 41 of the validation server 13 creates a validation server certificate identification table based on the set signature algorithm and the registered authority certificates and validation server certificates, and holds it in the setting information holding unit 45.

FIG. 9 shows an example of the validation server certificate identification table 90. The validation server certificate identification table 90 includes authority certificate file name 92, validation server certificate file name 93, and response signature algorithm 94, for each of authority certificate identifiers 91.

The authority certificate identifier 91 is a pair of the hash value of subject name (subject) and the hash value of public key (subjectPublicKeyInfo) that are written to an authority certificate, and calculated using the reference hash algorithm. It is the same as each of the authority certificate identifiers 62 of the certificate authority identification table 60 shown in FIG. 6. The example shown in FIG. 9 forms columns of the validation server certificate identification table 90 in association with authority certificate identifier 62 of the certificate authority identification table 60 shown in FIG. 6.

The managing unit 41 writes the file name of an authority certificate to the row of the authority certificate file name 92, for each of the authority certificate identifiers 91, and writes the file name of a validation server certificate to the row of the validation server certificate file name 93.

The managing unit 41 writes one of the descriptions that the algorithm of affixing a signature to a validation result is the same as the signature algorithm of an authority certificate of a certificate authority that issued a validation server certificate, is the same as the signature algorithm of a validation server certificate issued from a certificate authority, and is the same as the signature algorithm of the CRL issued from a certificate authority, to the row of the response signature algorithm 94, for each of authority certificate identifiers 91. For a validation server certificate, when the algorithm of affixing a signature to a validation result is the same as the signature algorithm of an authority certificate, the OID of the signature algorithm is acquired by referring to a signature algorithm (signatureAlgorithm) written to a corresponding authority certificate. When the algorithm of affixing a signature to a validation result is the same as the signature algorithm of a validation server certificate issued from a certificate authority, the OID of the signature algorithm is obtained by referring to a signature algorithm (signatureAlgorithm) written to a corresponding validation server certificate. When the algorithm of affixing a signature to a validation result is the same as the signature algorithm of the CRL issued from a certificate authority, the OID of the signature algorithm is obtained by referring to values written to the column of signature algorithm OID of the revocation information table 80.

When an arbitrary authority certificate identifier of the row of the authority certificate identifier 91 of the validation server certificate identification table 90 is defined as default, and the authority certificate identifier of a certificate authority that issued a verification target certificate does not exist in the certificate authority identification table 60, a default validation server certificate is used to affix a signature to a validation result. In the validation server certificate identification table 90 shown in FIG. 9, the authority certificate identifier 91 of "12345/abcde" is used as default.

The operator of the validation server 13 performs the setting of CRL update timing in advance. Specifically, the operator of the validation server 13, for each of the certificate authorities that the validation server 13 addresses, inputs the timing of updating CRL (e.g., "one day" when CRL is updated once a day) through the input/output unit 40*d*, and the managing unit 41 registers the CRL update timing in the setting information holding unit 45.

Figure 7:
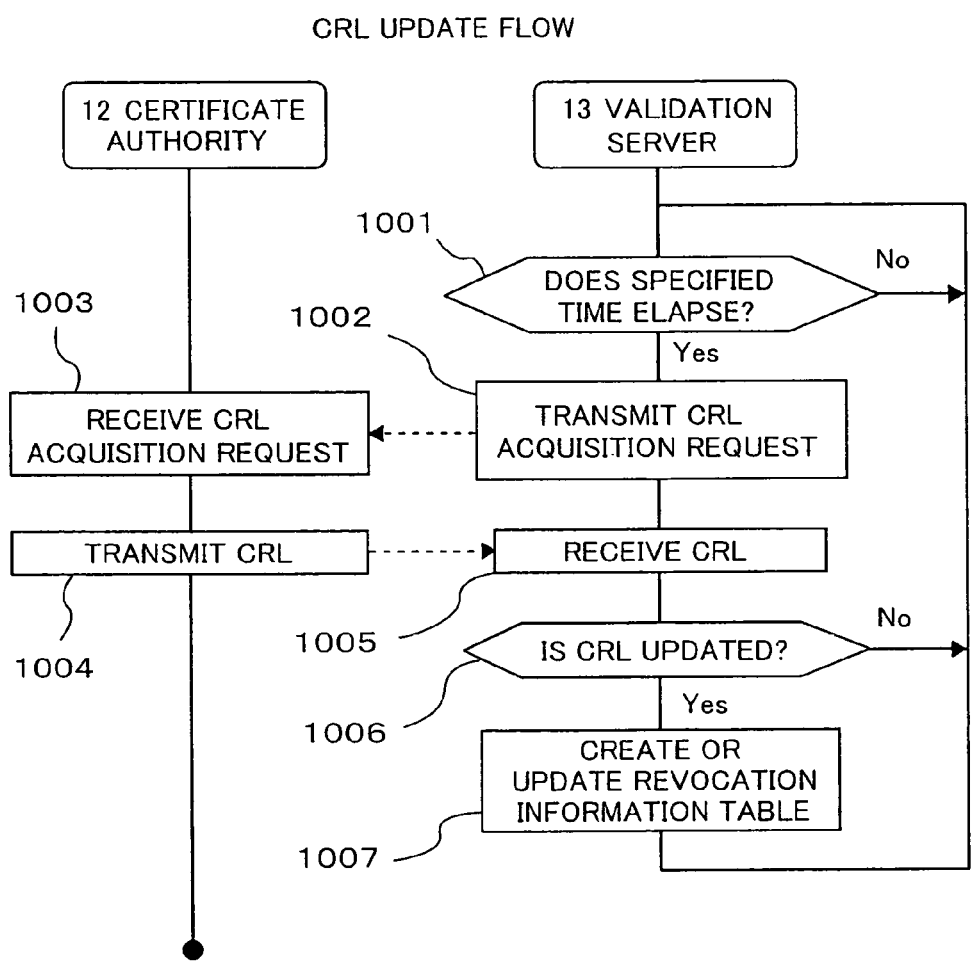
FIG. 7 is a flowchart of CRL updating in a validation server.

FIG. 7 shows a flowchart of CRL updating performed by the validation server 13. When CRL update timing (e.g., one day) set previously in the setting information holding unit 45 by the operator of the validation server 13 elapses (Step 1001), the revocation information managing unit 42 transmits a CRL acquisition request to the certificate authority 12 through the communication unit 40*c* (Step 1002). On receiving the CRL acquisition request (Step 1003), the certificate authority 12 affixes a signature to CRL by using a secret key, and transmits the CRL to the validation server 13 (Step 1004). The CRL contains the following information at the time of creation of the CRL: the name (issuerName) of the certificate authority 12, the key information (authorityKeyIdentifier) of the certificate authority 12, the serial numbers (userCertificate) of revoked public key certificates of those not expiring that were issued from the certificate authority 12, CRL validity period (CRL creation date, next CRL creation date), and other information.

On receiving the CRL from the certificate authority 12 (Step 1005), the revocation information managing unit 42 of the validation server 13 uses the authority certificate (public key certificate of the certificate authority 12) to confirm the signature of the certificate authority, then determines whether the received CRL has been updated (Step 1006). Since the CRL includes the date of CRL creation by the certificate authority 12, when the creation date of the CRL received from the certificate authority 12 is newer than the creation date of CRL of the certificate authority 12 acquired previously, the CRL of the certificate authority 12 has been updated. When the received CRL of the certificate authority 12 has not been updated, the processing proceeds to Step 1001. For the first reception of CRL from the certificate authority 12, the processing proceeds to Step 1007.

When the received CRL has been updated, the revocation information managing unit 42 creates or updates a revocation information table, based on the received CRL, and stores the revocation information table 80 in the revocation information holding unit 46 (Step 1007).

FIG. 8 shows an example of the revocation information table 80. The revocation information table 80 stores, for each of certificate authority identifiers 81, the object ID (OID) 82 of CRL signature algorithm (signatureAlgorithm), a CRL validity period (CRL creation date, next CRL creation date) 83, the serial numbers (userCertificate) 84 of revoked public key certificates, and a revocation date 85 and a reason of revocation 86 for each of the serial numbers 84 of revoked public key certificates.

The revocation information table 80 is updated or created as described below. The revocation information managing unit 42 uses the values of issuer name (issuerName) and authority key identifier (authorityKeyIdentifier) written in the acquired CRL as a key to locate a corresponding authority certificate from among authority certificates registered in the setting information holding unit 45, and acquires the located authority certificate. A certificate authority identifier is obtained using the reference hash algorithm from the authority certificate. The revocation information managing unit 42 uses the obtained certificate authority identifier as key, and searches the column of certificate authority identifier 81 of the revocation information table 80 for the same certificate authority identifier. When the same certificate authority identifier does not exist, the revocation information managing unit 42 determines the CRL as the CRL of a new certificate authority 12, and adds the obtained certificate authority identifier to the column of certificate authority identifier 81 of the revocation information table 80.

It writes the signature algorithm (signatureAlgorithm) and validity period (thisUpdate, nextUpdate) of the CRL to the column of signature algorithm OID 82 and the column of CRL validity period 83, respectively, or updates them.

The revocation information managing unit 42 registers information of revoked certificates (revokedCertificates) written in the CRL in the revocation information table 80 in association with authority identifiers. Specifically, it writes the serial numbers (userCertificates) of certificates, written in the revoked certificates (revokedCertificates) of the CRL, to the serial numbers 84 of revoked certificates in the revocation information table 80, writes revocation date (revocationDate) to the certificate revocation date 85, and writes revocation reason (reasoncode) to the reason of certificate revocation 86. The meanings of numbers of revocation reason (reasonCode) are described in the RFC5280.

For example, assume that certificate authority 1 with a certificate authority identifier 81 of "12345" updates key at 24:00 of 30 Sep. 2006, an authority identifier is "12345/aabce" corresponding to pre-update old authority certificate (CA1_old certificate), and an authority identifier is "12345/abcde" corresponding to post-update new authority certificate (CA1_new certificate). In this case, the serial numbers "3" and "5" in the column of serial numbers 84 of revoked certificates in the revocation information table 80 are the serial numbers of public key certificates issued by the certificate authority 1 before the key is updated, and the serial numbers "122," "123," and "200" are the serial numbers of public key certificates issued by the certificate authority 1 after the key is updated. These serial numbers are included in CRL corresponding to the authority certificate (CA1_new certificate) using current key (post-update key) regardless of before and after the key is updated.

The above-described CRL updating is performed in the timing in which, when the validation server 13 addresses plural certificate authorities 12, it refers to the CRL validity period 83 of each of the certificate authorities 12, and the CRL is newly created.

Figure 10:
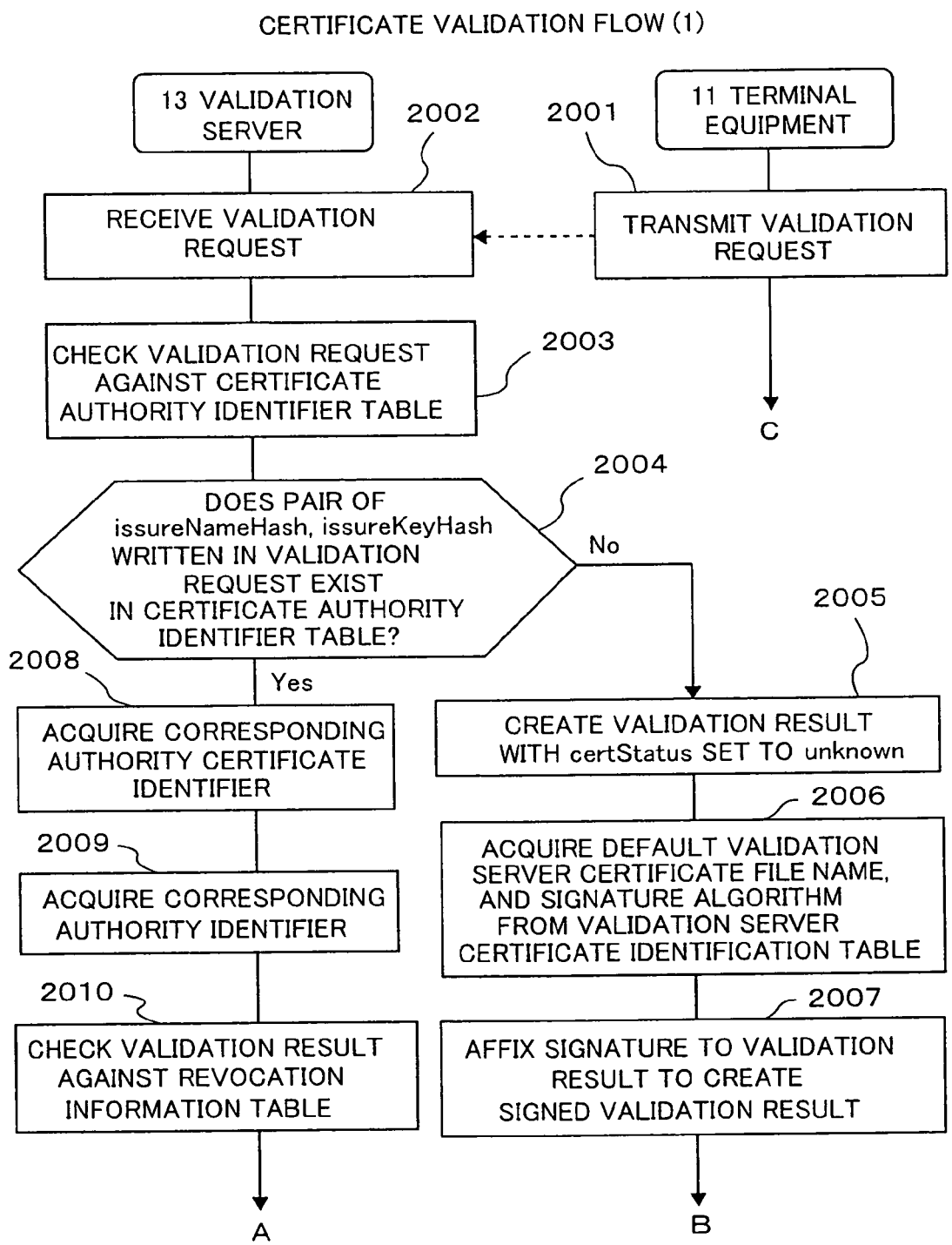
FIG. 10 is a flowchart of validation processing for public key certificates in a validation server.

FIGS. 10 and 11 show flowcharts of verification processing for public key certificates performed by the validation server 13. The signature/certificate validation unit 22 of the terminal equipment 11 creates a validation request to determine whether a public key certificate (other public key certificate in the description of FIG. 2) attached to an electronic document from other terminal equipment 11 is revoked, and transmits it to the validation server 13 through the communication unit 20*c* (Step 2001). The validation request from the terminal equipment 11 includes the name information (issuerNameHash) and key information (issuerKeyHash) of the certificate authority 12 produced by hash calculation from the name data and key data of the certificate authority 12, respectively.

On receiving the validation request (Step 2002), the validation processing unit 43 of the validation server 13 checks the certificate authority identification table 60 held in the revocation information holding unit 46 against the received validation request (Step 2003), and determines whether a corresponding hash value exists (Step 2004). Specifically, it determines whether, of information (CertID) identifying a verification target certificate, included in the validation request, a pair of the name information (issuerNameHash) and key information (issuerKeyHash) of certificate authority, which is hash values, exists in the certificate authority identification table 60.

When a pair of hash values included in the validation request does not exist in the certificate authority identification table 60 (Step 2004), since the validation processing unit 43 has no revocation information for the validation request, it creates validation result data with revocation information (CertStatus) of the verification target certificate set to "unknown" (Step 2005). It acquires a default validation server certificate file name 93 and a signature algorithm 94 from the validation server certificate identification table 90 (Step 2006), affixes a signature to the validation result by server certificate key held in the key holding unit 48 to create a signed validation result (Step 2007), and proceeds to Step 2107.

When a pair of hash values included in the validation request exists in the certificate authority identification table 60 (Step 2004), the validation processing unit 43 acquires an authority certificate identifier corresponding to the pair of hash values (Step 2008), and acquires a certificate authority identifier (Step 2009).

The validation processing unit 43 checks the validation request against the revocation information table 80 (Step 2101). Specifically, it uses the certificate authority identifier acquired in Step 2009 as key to search the certificate authority identifier 81 of the revocation information table 80, and locates a certificate authority identifier 81 that is the same as the acquired certificate authority identifier. Next, it compares the serial number (serialNumber of CertID) of the verification target certificate included in the validation request with the serial number 94 of a revoked certificate corresponding to the located certificate authority identifier 81 to determine whether the serial number of the verification target certificate is written in the serial number of revoked certificate 84 of the revocation information table 80 (Step 2101).

When the serial number of the verification target certificate included in the validation request does not exist in the revocation information table 80 (Step 2101), the validation processing unit 43 creates validation result data with revocation information (CertStatus) of the verification target certificate set to "valid (good)" (Step 2102), and proceeds to Step 2104.

When the serial number of the verification target certificate included in the validation request exists in the revocation information table 80 (Step 2101), the validation processing unit 43 creates validation result data with revocation information (CertStatus) of the verification target certificate set to "revoked" (Step 2103).

The validation processing unit 43 checks the validation request against the validation server certificate identification table 90. Specifically, it uses the authority certificate identifier obtained in Step 2008 as a key to search the authority certificate identifier 91 of the validation server certificate identification table 90, and locates the authority certificate identifier 91 that is the same as the acquired authority certificate identifier (Step 2104). The validation processing unit 43 acquires a validation server certificate file name and signature algorithm that correspond to the located authority certificate identifier 91 (Step 2105). The validation processing unit 43 uses the validation server certificate file name and signature algorithm acquired in Step 2105 to create a signed validation result by affixing a signature to a validation result by the key of the validation server certificate held in the key holding unit 48 (Step 2106).

The validation processing unit 43 transmits the created validation result data to the terminal equipment 11 through the communication unit 40c (Step 2107). The terminal equipment 11 receives the validation result data corresponding to the validation request from the validation server 13 (Step 2108), and determines whether the verification target certificate is revoked.

The above-described verification processing is, in association with the example described previously, described using concrete examples of a verification target certificate with the serial number "5" allocated that was issued before the certificate authority 1 updates key, and a verification target certificate with the serial number "150" allocated that was issued after the key is updated.

A pair of the name information (issuerNameHash) and the key information (issuerKeyHash) of certificate authority that are included in the validation request on the serial number "5" issued from the certificate authority 1 before updating the key is "12345/aabce". When the certificate authority identification table 60 is referred to, for the old authority certificate (CA1_old certificate) before the key is updated, the authority certificate identifier 62 is "12345/aabce," and the authority identifier 66 is "12345." When the revocation information table 80 is referred to, for the certificate authority identifier "12345," since the serial number "5" of the verification target certificate included in a validation request exists as the serial number of a revoked certificate, the validation processing unit 43 creates validation result data with revocation information (CertStatus) of the verification target certificate set to "revoked." The validation processing unit 43 uses authority certificate identifier "12345/aabce" as a key to search the authority certificate identifier 91 of the validation server certificate identification table 90, and acquires the corresponding validation server certificate name 93 "/tmp/ser1_old.cer" and signature algorithm "same as CRL signature algorithm." The validation processing unit 43 uses the acquired validation server certificate file name and a CRL signature algorithm identified by the OID 82 of signature algorithm of the revocation information table 80 to create a signed validation result by affixing a signature to the validation result by the key of the validation server certificate held in the key holding unit 48.

A pair of the name information (issuerNameHash) and the key information (issuerKeyHash) of certificate authority that is included in the validation request on the serial number "150" issued from the certificate authority 1 after updating key is "12345/abcde." When the certificate authority identification table 60 is referred to, for a new authority certificate (CA1_new certificate) after the key is updated, the authority certificate identifier 62 is "12345/abcde," and the certificate authority identifier 66 is "12345." When the revocation information table 80 is referred to, for the new authority identifier "12345," since the serial number "150" of the verification target certificate included in the validation request does not exist as the serial numbers of revoked certificates, the validation processing unit 43 creates validation result data with revocation information (CertStatus) of the verification target certificate set to "valid (good)." The validation processing unit 43 uses the authority certificate identifier "12345/abcde" as a key to search the authority certificate identifier 91 of the validation server certificate identification table 90 to acquire the corresponding validation server certificate file name 93 "/tmp/ser1_new.cer" and signature algorithm "same as signature algorithm of authority certificate." The validation processing unit 43 uses the acquired validation server certificate file name and the signature algorithm of the authority certificate (CA1_new certificate) to create a signed validation result by affixing a signature to the validation result by the key of the validation server certificate held in the key holding unit 48.

The above-described example of verification processing has been described on the assumption that the terminal equipment 11 uses SHA-1 as a hash algorithm to obtain a pair of the name information (issuerNameHash) and the key information (issuerKeyHash) of certificate authority. However, when the terminal equipment 11 uses hash algorithms SHA-256 and SHA-512, there is no difference in terms of processing except that target rows change during reference to the certificate table 60.

According to this embodiment, even when a certificate authority updates key, the validation server can verify the validity of public key certificates issued from the certificate authority regardless of before and after the key is updated. By using a certificate authority identifier identifying a certificate authority regardless of the updating of key, even when there are plural certificate authorities, the validation server can verify the validity of a public key certificate issued from each of them. Furthermore, even if a hash algorithm used by terminal equipment that transmits a validation request for verifying the validity of a public key certificate is changed by the terminal equipment, the validation server has plural hash algorithms that may be used, and can identify certificate authorities and authority certificates by providing a certificate authority identification table that stores pairs of hash values generated by using the plural hash algorithms.

What is claimed is:

1. A verification method by a validation server that is connected to a certificate authority and terminal equipment, and verifies the validity of public key certificates issued from the certificate authority, the verification method comprising the steps of:
   when key information of the certificate authority has been updated, acquiring an authority certificate of the certificate authority including first information identifying the certificate authority and the updated key information;
   in association with the key information updated by the certificate authority, acquiring, from the certificate authority, revocation information indicating public key certificates issued by the certificate authority that are within a validity period but were revoked regardless of whether the key information of the certificate authority is updated or not; and
   in response to a validation request from the terminal equipment, the validation request including second information identifying the certificate authority, key information of the certificate authority at issuance of a public key certificate, and information identifying the public key certificate, creating a validation result indicating that the public key certificate corresponding to the information identifying the public key certificate included in the validation request is valid if the second information identifying the certificate authority included in the validation request corresponds to the first information identifying the certificate authority included in the authority certificate, and the information identifying the public key certificate included in the validation request does not exist in the revocation information.

2. The method for verifying public key certificates according to claim 1,
   wherein the validation server:
   acquires, from the certificate authority, a validation server certificate that is a public key certificate of the validation server,
   uses a secret key corresponding to a public key of the validation server certificate to affix a signature to the validation result, and
   transmits the signed validation result to the terminal equipment.

3. The method for verifying public key certificates according to claim 2, wherein a signature algorithm determined by the certificate authority is used for signature to the validation result.

4. The method for verifying public key certificates according to claim 1, wherein
   the validation server holds a pair of respective hash values of the first information identifying the certificate authority and the updated key information that are included in the authority certificate, and
   if the second information identifying the certificate authority and the key information of the certificate authority at issuance of the public key certificate that are included in the validation request from the terminal equipment are a pair of their respective hash values, the hash value of the second information corresponds to the hash value of the first information, and the information identifying the public key certificate included in the validation request does not exist in the revocation information, the validation server creates a validation result indicating that the public key certificate corresponding to the information identifying the public key certificate included in the validation request is valid.

5. The method for verifying public key certificates according to claim 4,
   wherein the validation server has a plurality of types of hash algorithms to obtain the hash values, the held pair of the hash values is a pair of hash values obtained previously in association with each of the plurality of types of hash algorithms, and the validation server determines whether a pair of the respective hash values of the second information identifying the certificate authority and the key information of the certificate authority at issuance of the public key certificate that are included in the validation request corresponds to any one of pairs of hash values obtained previously in association with the plurality of types of hash algorithms.

6. The method for verifying public key certificates according to claim 1, further comprising the step of when the key information of the certificate authority has been updated, adding a second identifier different from a first identifier identifying an authority certificate existing before the key information of the certificate authority is updated, to the authority certificate of the certificate authority that includes the first information identifying the certificate authority and the updated key information.

7. The method for verifying public key certificates according to claim 6,
   wherein the validation server executes the steps of:
   acquiring a validation server certificate that is a public key certificate of the validation server from the certificate authority;
   if the second information identifying the certificate authority included in the validation request corresponds to the first information identifying the certificate authority included in the authority certificate provided with one of the first and second identifiers, and information identifying the public key certificate included in the validation request does not exist in the revocation information, creating a validation result indicating that the public key certificate corresponding to information identifying the public key certificate included in the validation request is valid;

affixing a signature to the validation result by using a signature algorithm determined previously by a certificate authority which is provided with one of the first and second identifiers and which has issued the valid public key certificate, and a secret key corresponding to the public key of the validation server certificate; and transmitting the signed validation result to the terminal equipment.

8. The method for verifying public key certificates according to claim 1, wherein the validation server connects with a plurality of certificate authorities, and if the second information identifying a certificate authority included in the validation request corresponds to third information identifying a certificate authority included in any one of the authority certificates issued respectively from the plurality of certificate authorities, and information identifying the public key certificate included in the validation request does not exist in the revocation information acquired from the certificate authority identified by the third information, the validation server creates a validation result indicating that the public key certificate corresponding to the information identifying the public key certificate included in the validation request is valid.

9. A validation server that connects with a certificate authority and terminal equipment and verifies public key certificates, comprising:

a setting information holding unit that, when key information of the certificate authority has been updated, holds an authority certificate of the certificate authority that includes first information identifying the certificate authority and the updated key information;

a revocation information holding unit that holds revocation information indicating public key certificates issued by the certificate authority that are within a validity period but were revoked regardless of whether the key information of the certificate authority is updated or not; and a validation processing unit that, in response to a validation request from the terminal equipment, the validation request including second information identifying the certificate authority, key information of the certificate authority at issuance of a public key certificate, and information identifying the public key certificate, creates a validation result indicating that the public key certificate corresponding to the information identifying the public key certificate included in the validation request is valid if the second information identifying the certificate authority included in the validation request corresponds to the first information identifying the certificate authority included in the authority certificate, and the information identifying the public key certificate included in the validation request does not exist in the revocation information.

10. The server verifying public key certificates according to claim 9, further comprising a validation server certificate holding unit that holds a validation server certificate that is a public key certificate of the validation server, wherein the validation processing unit uses a secret key corresponding to a public key of the validation server certificate held in the validation server certificate holding unit to affix a signature to the validation result, and transmits the signed validation result to the terminal equipment.

11. The server verifying public key certificates according to claim 10, wherein a signature algorithm determined previously by the certificate authority is used for signature to the validation result.

12. The server verifying public key certificates according to claim 9, wherein the setting information holding unit holds a pair of respective hash values of the first information identifying the certificate authority and the updated key information that are included in the authority certificate, and wherein if the second information identifying the certificate authority and the key information of the certificate authority at issuance of the public key certificate that are included in the validation request from the terminal equipment are a pair of the respective hash values, the hash value of the second information corresponds to the hash value of the first information, and the information identifying the public key certificate included in the validation request does not exist in the revocation information, the validation processing unit creates a validation result indicating that the public key certificate corresponding to the information identifying the public key certificate included in the validation request is valid.

13. The server verifying public key certificates according to claim 12, wherein the setting information holding unit has a plurality of types of hash algorithms to obtain the hash values, and the held pair of the hash values is a pair of hash values obtained previously in association with each of the plurality of types of hash algorithms, and wherein the validation processing unit determines whether a pair of the respective hash values of the second information identifying the certificate authority and the key information of the certificate authority at issuance of the public key certificate that are included in the validation request corresponds to any one of pairs of hash values obtained previously in association with the plurality of types of hash algorithms held in the setting information holding unit.

14. The server verifying public key certificates according to claim 9, wherein, when the key information of the certificate authority has been updated, the setting information holding unit adds a second identifier different from a first identifier identifying an authority certificate existing before the key information of the certificate authority is updated, to the authority certificate of the certificate authority that includes the first information identifying the certificate authority and the updated key information, and holds the authority certificate.

15. The server verifying public key certificates according to claim 14, further comprising a validation server certificate holding unit that holds a validation server certificate that is a public key certificate of the validation server, wherein if the second information identifying the certificate authority included in the validation request corresponds to the first information identifying the certificate authority included in the authority certificate provided with one of the first and second identifiers, and information identifying the public key certificate included in the validation request does not exist in the revocation information, the validation processing unit creates a validation result indicating that the public key certificate corresponding to information identifying the public key certificate included in the validation request is valid, affixes a signature to the validation result by using a signature algorithm determined previously by a certificate authority which is provided with one of the first and second identifiers and which has issued the valid public key certificate, and a secret key corresponding to the public key of the validation server certificate, and transmits the signed validation result to the terminal equipment.

16. The server verifying public key certificates according to claim 9,
wherein the validation server connects with a plurality of certificate authorities, and if the second information identifying a certificate authority included in the validation request corresponds to third information identifying a certificate authority included in any one of the authority certificates issued respectively from the plurality of certificate authorities, and information identifying the public key certificate included in the validation request does not exist in the revocation information acquired from the certificate authority identified by the third information, the validation processing unit creates a validation result indicating that the public key certificate corresponding to the information identifying the public key certificate included in the validation request is valid.

* * * * *